United States Patent [19]

Young

[11] 3,809,926

[45] May 7, 1974

[54] WINDOW DETECTOR CIRCUIT

[75] Inventor: Alexander Wilson Young, High Bridge, N.J.

[73] Assignee: RCA Corporation, New York, N.Y.

[22] Filed: Mar. 28, 1973

[21] Appl. No.: 345,707

[52] U.S. Cl. ............. 307/235 R, 307/237, 307/251, 307/304

[51] Int. Cl. ............................................. H03k 5/20

[58] Field of Search ............ 307/235, 237, 304, 251

[56] References Cited

UNITED STATES PATENTS

| | | | |
|---|---|---|---|
| 3,628,070 | 12/1971 | Heuner et al. | 307/235 R |
| 3,139,562 | 6/1964 | Freeborn | 307/318 X |
| 3,586,879 | 6/1971 | Ford | 307/235 R |
| 3,697,780 | 10/1972 | Michael et al. | 307/235 R |

*Primary Examiner*—John Zazworsky

[57] ABSTRACT

The circuit includes an MOS transistor for transmitting the applied voltage wave to the output signal terminal during the interval that applied voltage is between two voltage limits and circuit elements responsive to the applied voltage wave exceeding the higher of these limits for disabling the MOS transistor and for clamping the output signal terminal to a reference level such as ground.

24 Claims, 4 Drawing Figures

WINDOW DETECTOR CIRCUIT

This invention relates to threshold detection circuits and particularly to threshold detection circuits having multiple threshold levels.

Threshold detection circuits are useful for producing an output signal of a desired form when an input signal is greater or lesser than a particular value commonly called the threshold level or voltage. Threshold detectors may have several threshold levels for producing a number of output signals representative of different values of an input signal. Such multiple threshold detectors are commonly known in the art and are useful, for example, in quantizing analog input signals for use by digital devices.

Another form of multiple threshold detector is the so-called "window" detector or discriminator. Window detectors are used, for example, to provide an output signal of a desired form when the input signal lies within a range of values between two threshold levels. The form of the output signal may generally be of two types: digital or analog. A window detector having a digital output provides a binary output signal when the input signal lies between the threshold values. A window detector having analog output provides a replica of the input signal when the input signal lies within the threshold limits.

It is conventional in both forms of window detectors to employ, for example, voltage references and comparators to sense the input voltage and apply the comparator outputs to a logic gate to obtain a single digital output signal. When analog replicas of the input signal are desired, the logic gate output is used to control a switch connected to the input terminal for sampling the input signal.

Current implementation of window detectors involves the use of complex circuitry. A need exists for a simplified window detector or discriminator and particularly one whose elements are suitable for use in integrated circuit technology. In particular, a window detector is needed which employs relatively few elements, all of which are suitable for use in an integrated circuit form.

In a preferred embodiment of the present invention, a turn-on voltage is applied to the conduction path of a transistor. When the threshold, $V_t$, of the transistor is reached, the turn-on voltage is conducted through the transistor to an output signal terminal. A threshold circuit responsive also to the turn-on voltage and having a threshold greater than $V_t$ both turns off the transistor and clamps the output signal terminal to a reference level such as ground when the applied voltage exceeds the threshold of the threshold circuit.

The invention is illustrated in the accompanying drawings, of which:

Figure 1:
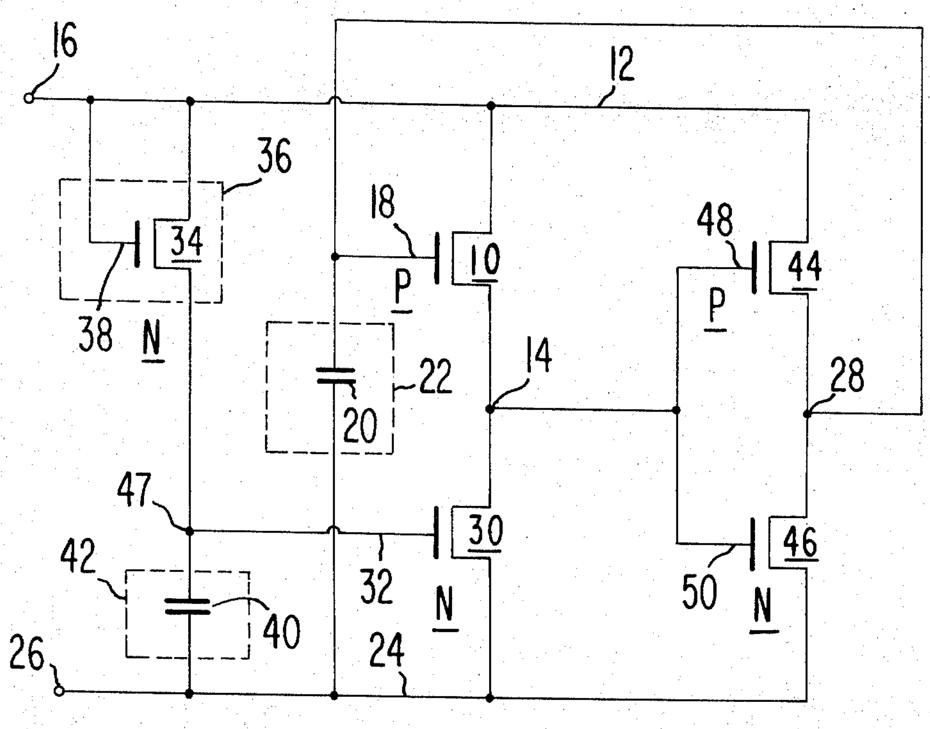
FIG. 1 is a schematic diagram of an embodiment of the invention.

In the embodiment shown in FIG. 1, transistor 10 has its conduction path connected between input buss 12 and output terminal 14. Input bus 12 is connected to input terminal 16 for receiving a source of input signals. The control electrode 18 of transistor 10 is connected to circuit point 28 and to one terminal of capacitor 20 within dashed box 22. The other terminal of capacitor 20 is connected to ground bus 24, which, in turn, is connected to input terminal 26 for receiving a suitable source of reference potential such as ground.

Transistor 30 has its conduction path connected between output terminal 14 and ground bus 24. Transistor 34 indicated in dashed box 36 has its conduction path coupled between input bus 12 and control electrode 32 of transistor 30. Control electrode 38 of transistor 34 is also connected to input bus 12. Capacitor 40 in dashed box 42 is coupled between control electrode 32 of transistor 30 and ground bus 24. The conduction path of transistor 44 is coupled between input bus 12 and circuit point 28. The conduction path of transistors 46 is coupled between circuit point 28 and ground bus 24. Control electrode 48 of transistor 44 and control electrode 50 of transistor 46 are each connected to output terminal 14.

In the following discussion of the operation of the circuit just described, assume that transistor 10 and transistor 44 are P type metal-oxide-semiconductor transistors and that transistor 30, transistor 34, and transistor 46 are N type metal-oxide-semiconductor transistors as indicated by the letters P & N, respectively. Also, assume that input terminal 26 is maintained at ground potential and that a positive input signal is applied to input terminal 16.

It is known that enhancement mode field effect transistors exhibit threshold conduction characteristics, that is, the conduction path of a field effect transistor remains substantially nonconductive, until the voltage applied to the control electrode of the field effect transistor reaches a particular value known as the threshold voltage of the transistor. This characteristic is employed to advantage in the present invention where field effect transistors are used as threshold conduction elements for detecting discrete values of the input voltage applied to terminal 16.

Assume initially, that the input voltage is at ground level and that capacitor 20 and capacitor 40 are discharged. In this condition, both transistor 10 and transistor 30 are non-conducting and output terminal 14 is effectively isolated from input buss 12 and ground buss 24. As the voltage applied to input terminal 16 begins to rise (to become more positive), the voltage on control electrode 18 of transistor 10 remains at ground potential because, as it was assumed, capacitor 20 is not charged. When the input voltage reaches the threshold value of transistor 10, transistor 10 turns on, clamping output terminal 14 to the input voltage level on buss 12. The positive voltage level at 14 is applied to control electrode 50 of transistor 46 and serves as a turn on signal for transistor 46. This transistor now conducts and clamps circuit point 28 to ground, thus assuring that control electrode 18 is maintained at ground potential and that capacitor 20 remains discharged. At this point, so long as the input voltage applied to input terminal 16 is maintained above the threshold voltage of transistor 10, and below a second threshold level to be subsequently described, transistor 10 remains on and consequently output terminal 14 provides a replica of the input voltage applied to terminal 16.

The function of capacitor 20, indicated in dashed box 22, is to prime control electrode 18 of transistor 10 so that transistor 10 will turn on when the input voltage on input buss 12 exceeds the threshold voltage of transistor 10. Capacitor 20 is particularly suitable for this purpose since, as will be subsequently described, when transistor 44 turns on, control electrode 18 will be clamped to input buss 12, thus providing the full input voltage between control electrode 18 and ground buss 24. Since the principal power loss in a capacitor, as used here, is due to leakage currents through the capacitor and since these leakage currents are usually quite small, the use of a capacitor to prime control electrode 18 (rather than, for example, a resistor) is helpful to assure low power operation of the circuit as a whole. It is also to be noted that capacitor 20 provides a measure of noise suppression to control electrode 18 of transistor 10; also it is to be emphasized that capacitor 20 is used for priming purposes and not as a timing element in this embodiment of the invention. In particular, neither capacitor 20 nor capacitor 40 which will be subsequently described, are used for timing purposes.

Still considering the case of when the input voltage applied to input terminal 16 has reached a first threshold value, transistor 34 indicated in dashed box 36, will begin to conduct. Since transistor 34 is an N-type transistor, having its control electrode 28 connected to input buss 16, and since capacitor 40 initially is not charged, transistor 34 will operate in the source follower mode to provide a current to capacitor 40. As is commonly known, when a field effect transistor has it gate connected to its drain and is operated in the source follower mode, a voltage is developed across the transistor's conduction path equal to the threshold voltage of the transistor. Capacitor 40 will thus have a voltage across its terminals equal to the input voltage applied to terminal 16 less the threshold voltage of transistor 34. It follows that when the input voltage applied to terminal 16 is equal to the threshold voltage of transistor 34 (operating in the source follower mode), the voltage appearing on control electrode 32 of transistor 30 and at the upper terminal of capacitor 40 will be zero. Hence, transistor 30 will not be turned on.

As the input voltage continues to rise, however, a constant voltage drop appears across the conduction path of transistor 34. When the difference between the input voltage and the voltage drop across transistor 34 is equal to the threshold voltage of transistor 30, transistor 30 will turn on. At this point, it is to be noted that both transistor 30 and transistor 10 are conducting. If the on resistance of transistor 30 is less than the on resistance of transistor 10, the voltage on output terminal 14 will be equal to the differential voltage between buss 12 and buss 24 times a factor equal to the on resistance of transistor 30 divided by the sum of the on resistance of transistor 30 and the on resistance of transistor 10. It necessarily follows, therefore, that the voltage appearing at output terminal 14 will be less than ½ of the voltage applied to input terminal 16.

The above is an important consideration in regard to the operation of transistors 44 and 46. These transistors connected as previously described, operate as a complementary symmetry inverter when the voltage on input buss 12 is sufficiently high. As is well known in the art, the characteristic transfer function of a complementary symmetry inverter is related to the operating voltage applied to the inverter. Typically, such inverters have a transfer function which is characterized by switching at approximately 50 percent of the supply voltage. Under normal manufacturing tolerances, this switching point may vary from a low of ⅓ of the supply voltage to a high of roughly ⅔ of the supply voltage. If the on resistance of transistor 30 is made less than ½ of the resistance of transistor 10, then the voltage at terminal 14, when both transistors are on, will be less than ⅓ of the supply voltage appearing on input buss 12. This causes the inverter formed by transistors 44 and 46 to invert the signal present on output terminal 14, thus clamping control electrode 18 of transistor 10 to the voltage of input buss 12. In other words, the signal at 14 turns transistor 46 off and transistor 44 on, and control electrode 18 is thereupon placed at substantially the potential on buss 12 through the low impedance conduction path of transistor 44. This causes transistor 10 to turn off and output terminal 14, therefore, becomes clamped to ground level through the conduction path of transistor 30.

The operation of the circuit to this point may be summarized as follows: when the input voltage is initially at ground potential transistor 10 and transistor 30 are nonconducting and output terminal 14 is isolated from both input buss 12 and ground buss 24. In addition, capacitor 20 is not charged, thus, maintaining control electrode 18 of transistor 10 at ground potential, thus priming transistor 10. When the input voltage reaches its threshold value, transistor 10 turns on in the common source mode, clamping output terminal 14 to supply buss 12. This causes transistor 46 to turn on, clamping circuit point 28 to ground which maintains control electrode 18 of transistor 10 at ground which holds transistor 10 on. At this point, transistor 34 operates in the source follower mode and provides a control voltage control electrode 32 of transistor 30 equal to the input voltage minus the threshold voltage of the source follower transistor 34.

When the input voltage is equal to the sum of threshold voltages of transistors 34 and 30, transistor 30 turns on. This causes output terminal 14 to be at a potential equal to the voltage of supply buss 12 times the ratio of the on resistance of transistor 30 divided by the sum of the on resistance of transistors 30 and 10. This voltage is sufficiently low to cause transistor 46 to turn off and transistor 44 to turn on, clamping circuit point 28 to input buss 12, which, in turn, turns transistor 10 off. Since transistor 30 is still on, output terminal 14 is clamped to ground buss 24.

When the input voltage applied to input terminal 16 begins to fall, the potential appearing across the conduction path of transistor 34 will be reversed from its previous value because of the charge stored in capacitor 40 (that is, node 47 is more positive than the signal level on buss 12). Transistor 34 now operates in the common source mode but as the control electrode 38 of transistor 34 is coupled to input buss 12, transistor 34 is off and does not conduct charge from capacitor 40. Thus, transistor 30 remains conducting and output terminal 14 remains clamped to ground buss 24. This condition continues for so long as capacitor 40 is charged to a level higher than the potential applied to input terminal 16.

When the input voltage decreases to zero, the following action takes place. Transistor 44 operates in the source-follower mode to discharge capacitor 20. Transistor 34, however, is an N type device and operates in the commonsource mode when the input voltage goes to the ground potential. But, since control electrode 38 of transistor 34 is connected to input terminal 16, transistor 34 remains biased off and there is no direct discharge path for capacitor 40. Capacitor 40 does discharge, however, through normal circuit leakage resistances, and when the voltage across it is less than the threshold voltage of transistor 30, transistor 30 turns off, thus isolating output terminal 14 from both input buss 12 and ground buss 24 and the cycle of operation may be repeated.

The use of capacitors such as capacitor 20 and capacitor 40 limits the speed of operation of the embodiment of the invention just described. However, these elements do offer distinct advantages shown both in fabrication and in operation of the invention. For example, the circuit shown in FIG. 1 is particularly suitable for fabrication as an integrated circuit in metal-oxide-semiconductor technology where the capacitors are formed in the same processing steps as the transistors without requiring additional masking or diffusion steps other than those required to fabricate the transistors. This is possible because the capacitors are employed for priming (not timing) purposes and this requires only a few pico-Farads of capacity which is easily obtained in integrated circuit form. Another advantage of using capacitors in the circuit is that, over steady state conditions, the energy lost in the capacitors is very small. If a resistor were used in place of capacitor 40, circuit speed would be improved but circuit power dissipation would be increased since a resistor connected as capacitor 40 in FIG. 2 would dissipate energy continuously in the steady state condition.

The invention embodied in the circuit of FIG. 1 is particularly useful in a so called "power up reset" circuit. This is a circuit for providing a pulse to place circuits such as timers, checking circuits, counters, registers, and the like, in a known state in response in the application of power to these circuits. This power signal (a rising direct voltage level) is applied between input terminals 16 and 26 of the present circuit and in response thereto, the present circuit generates a pulse, as already described, for placing the utilization device to its desired state. This function is accomplished over a wide supply voltage range, a large variation in supply voltage rise times, requires no external components and draws only leakage currents after the reset pulse occurs. In particular, the circuit is suitable for integration on the same semiconductor chip as the counter, register, and the like. Thus, for example, an integrated circuit counter could be manufactured which would automatically assume a preset condition upon application of power without the need for external components or control leads other than those normally required by the counter itself. In such an application, the recovery speed limitation due to the capacitors is of little significance but the low power operation provided is a distinct advantage.

Figure 2:
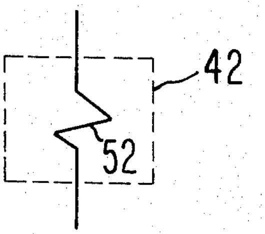
FIGS. 2, 3 and 4 are schematic diagrams of alternative elements for use in the circuit of FIG. 1.
Figure 3:
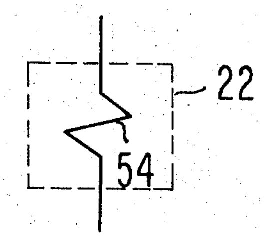

Referring now to FIG. 2, there are shown alternative elements for use in the circuit of FIG. 1, for speeding up the circuit operation. Resistor 52 as indicated in dashed box 42 of FIG. 2, may be used to advantage to replace capacitor 40 indicated in dashed box 42 of FIG. 1. The effect of making this substitution in the operation of the circuit is to increase an overall circuit operating speed because resistor 52 does not store the charge it receives from transistor 34 as did capacitor 40. Of course, this increased circuit speed is not without cost, the cost being increased power dissipation since resistor 52 dissipates power continuously when the input voltage applied to termial 16 is greater than the voltage drop across source follower connected transistor 34. In a similar manner, resistor 54 indicated in dashed box 22 of FIG. 3 may be used to replace capacitor 20, indicated in dashed box 22, of FIG. 1. Again, circuit speed is enhanced because resistor 54 does not store change in response to the current it receives from transistor 44 as did capacitor 20. On the other hand, resistor 54 dissipates energy in the steady state condition whereas capacitor 20 does not.

Figure 4:
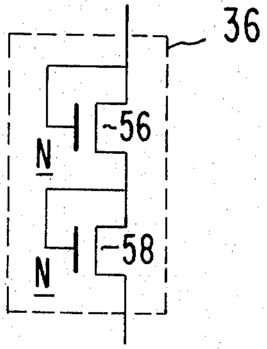

Series connected N type source follower transistors 56 and 58, indicated in dashed box 36 of FIG. 4, comprise a means for increasing the upper threshold voltage of the circuit of FIG. 1, when substituted for the single source follower transistor 34 indicated in dashed box 36 of FIG. 1. When such a substitution is made, the upper threshold voltage for the circuit will be equal to the sum of the individual threshold voltages of transistor 56, transistor 58, and transistor 30. Of course, other suitable threshold conduction means could be used as well, such as a Zener diode. The principal requirement for whatever threshold conduction device is selected for use in dashed box 36 is that it have a conduction path which is substantially conductive when the potential across the conduction path is greater than the selected value and substantially non-conductive otherwise.

It will be recognized by those skilled in the art that the circuit illustrated has a dual obtained by reversing the transistor types and power supply potentials. Further, the specific choice of complementary MOS transistors in the example given is not meant to be limiting of the invention disclosed. Other modifications may be made from the specific details described without departing from the spirit and the scope of the invention as defined in the following claims.

What is claimed is:

1. The combination of:

a first threshold circuit responsive to an input voltage for producing at its output terminal an output voltage corresponding to that portion of said input voltage of greater than a given amplitude;

a second threshold circuit having a threshold hihger than the first threshold circuit responsive also to said input voltage for clamping said output terminal to a point of reference voltage when said input voltage exceeds the threshold of said second threshold circuit; and feedback means responsive to signals present on said output terminal for providing a control signal to said first threshold circuit for inactivating said first threshold circuit when said output terminal is clamped to said point of reference voltage by said second threshold circuit.

2. The combination recited in claim 1 wherein said first threshold circuit comprises:

first and second circuit points adapted to receive said input voltage;

a first transistor having a conduction path and a control electrode for controlling the conduction of the path, said conduction path coupled between said first circuit point and said output terminal; and first load means coupling the control electrode of the first transistor to said second circuit point for priming said first transistor to turn on.

3. The combination recited in claim 2 wherein said first load means comprises a capacitor.

4. The combination recited in claim 2 wherein said first load means comprises a resistor.

5. The combination of:

a first threshold circuit responsive to an input voltage for producing at its output terminal an output voltage corresponding to that portion of said input voltage of greater than a given ampluitude, said first threshold circuit comprising:

first and second circuit points adapted to receive said input voltage;

a first transistor having a conduction path and a control electrode for controlling the conduction of the path, said conduction path coupled between said first circuit point and said output terminal; and first load means coupling the control electrode of the first transitor to said second circuit point for priming said first transistor to turn on; and a second threshold circuit having a threshold higher than the first threshold circuit responsive also to said input voltage for both inactivating said first threshold circuit and clamping said output terminal to a point of reference voltage when said input voltage exceeds the threshold of said second threshold circuit, said second threshold circuit comprising:

a second transistor having a conduction path and a control electrode for controlling the conduction of the path, said conduction path coupled between said output terminal and said second circuit point;

threshold conduction means having a conduction path coupled between said first circuit point and the control electrode of said second transistor, the threshold conduction means conduction path being substantially conductive when the potential across it is greater than a given value and being substantially non-conductive otherwise;

second load means coupled between said control electrode of said second transistor and said second circuit point for receiving current from said threshold conduction means; and inverter means coupled between said output terminal and said control electrode of said first transistor whereby signals present on said output terminal are inverted and applied to said control electrode of said first transistor.

6. The combination recited in claim 5 wherein said conduction paths of said first and second transistor are of complementary conductivity types and wherein the impedance of the conduction path of said first transistor is greater than the impedance of the conduction path of said second transistor when both transistors are turned on.

7. The combination recited in claim 5 wherein said threshold conduction means comprises a field-effect transistor having a conduction channel and a gate electrode for controlling the conduction of the channel, said gate electrode and one end of said conduction channel being coupled to said first circuit point, the other end of said conduction channel being coupled to said control electrode of said second transistor.

8. The combination recited in claim 5 wherein said inverter means comprises at least one pair of complementary transistors, each transistor having a conduction path and a control electrode, the conduction paths thereof being coupled in series between said first and second circuit points with the midpoint of said series connected to said control electrode of said first transistor and with said control electrodes of said complementary transistors coupled to said output terminal.

9. The combination recited in claim 5 wherein said second load means comprises a capacitor.

10. The combination recited in claim 5 wherein said second load means comprises a resistor.

11. In combination:

switch means having first and second input terminals adapted to receive a source of operating potential and having an output terminal, said switch means responsive to a first control signal manifestation for effectively isolating said output terminal from the input terminals, responsive to a second control signal manifestation for coupling said output terminal to said first input terminal, and responsive to a third control signal manifestation for coupling said output terminal to said second input terminal;

feedback means responsive to signals present on said output terminal for providing a control signal to said switch means;

control means responsive to signals present on said first input terminal for providing a second control signal to said switch means; and priming means coupled between said second input terminal and said switch means for initially placing said switch means in a first condition.

12. The combination recited in claim 11 wherein said switch means comprises:

a first semiconductor device having a conduction path of a first conductivity type coupled between said first input terminal and said output terminal and having a control electrode for controlling the conduction of the path, said control electrode receiving said control signal from said feedback means; and a second semiconductor device having a conduction path of a second conductivity type coupled between said second input terminal and said output terminal and having a control electrode for controlling the conduction of the path, the control electrode thereof receiving said second control signal from said control means.

13. The combination recited in claim 12 wherein the conduction path of the second semiconductor device is of higher conductivity than the conduction path of the first semiconductor device when both are biased to a conducting condition and wherein each said control electrode also receives a signal from said priming means for initially placing said control electrodes at the potential of said second input terminal for initially biasing said second semiconductor device to a non-conducting condition and initially biasing said first semiconductor device to a conducting condition when said operating potential is of a given value.

14. The combination recited in claim 13 wherein said priming means comprises first and second capacitors, each coupling a separate one of said control electrodes to said second input terminal.

15. The combination recited in claim 13, wherein said priming means comprises first and second resistors, each coupling a separate one of said control electrodes to said second input terminal.

16. The combination recited in claim 13 wherein said first and second semiconductor devices comprise a pair of complementary field-effect transistors.

17. The combination recited in claim 12 wherein said feedback means comprises inverter means for inverting signals present on said output terminal and applying the inverted signals to said control electrode of said first semiconductor device.

18. The combination recited in claim 17 wherein said inverter means comprises another pair of complementary field-effect transistors having their conduction paths serially connected between said first and second input terminals with the midpoint of the series connected to the control electrode of said first semiconductor device and with the gates thereof connected to said output terminal.

19. The combination recited in claim 12 wherein said control means comprises threshold conduction means having a conduction path which is substantially conductive when the potential thereacross is greater than a given value and which is substantially non-conductive, otherwise.

20. The combination recited in claim 19 wherein said threshold conduction means comprises a field-effect transistor with the gate electrode and one end of the conduction path thereof connected to said first input terminal and with the other end of the conduction path thereof connected to the control electrode of said second semiconductor device.

21. In combination:

a first and a second complementary symmetry inverters, each inverter comprising first and second field effect transistors of different conductivity types, each transistor having a conduction path and a gate electrode for controlling the conductivity of its path, each pair of transistors connected with their conduction paths in series between a signal input terminal and a second terminal as a reference voltage level, the first said transistor connected to said signal input terminal and the second to said second terminal, said circuit including a connection between the terminal at which the conduction paths of the transistors of the first inverter join one another and the gate electrodes of both transistors of the second inverter;

means for initially maintaining the gate electrode of the first transistor of the first inverter at a potential such that its conduction path exhibits a relatively low impedance, whereby when a signal applied to said first terminal exceeds a first level, said first transistor conducts and the control electrodes of said second inverter receive a signal through said conduction path at a level close to said signal level;

a feedback circuit for the connection between the conduction paths of the transistors of the second inverter to the gate electrode of the first transistor of the first inverter;

means for initially maintaining the gate electrode of the second transistor of the first inverter at a potential such that its conduction path exhibits a relatively high impedance; and means responsive to a signal applied to said signal input terminal of greater than a second level for placing the gate electrode of the second transistor of said first inverter at a voltage level such that its conduction path is at a relatively low impedance, whereby said second transistor of said first inverter conducts, changing the state of said second inverter, and causing the latter to apply a turn-off voltage to the gate electrode of the first transistor of said first inverter.

22. The combination recited in claim 21 wherein said means for initially maintaining the gate electrode of the first transistor at a potential such that its coduction path exhibits a relatively low impedance comprises a capacitor coupled between said gate electrode of said first transistor and said second terminal, said capacitor initially being in an uncharged condition whereby the gate electrodes of the first transistor is initially maintained at the potential of said reference voltage level thereby priming said first transistor to conduct when said signal exceeds said first level.

23. The combination recited in claim 22 wherein said means for initially maintaining the gate electrode of the second transistor of the first inverter at a potential such that its conduction path exhibits a relatively high impedance comprises a capacitor coupled between said gate electrode of the second transistor and said second terminal, said capacitor being initially in an uncharged condition whereby the gate electrode of the second transistor is initially maintained at the potential of said reference voltage thereby initially biasing the second transistor to a non-conducting condition.

24. The combination recited in claim 23 wherein said means responsive to a signal comprises another field-effect transistor having a conduction path with source and drain electrodes at the ends thereof and a gate electrode for controlling the conductivity of the path, said source electrode coupled to said gate electrode of said second transistor of said first inverter, said drain electrode and said gate electrode of said another field-effect transistor coupled to said signal input terminal whereby said another field-effect transistor is operable in a source follower mode for placing said gate electrode of said second transistor of said first inverter at said voltage level in response to said signal applied to said first terminal.

* * * * *